United States Patent
Park

(10) Patent No.: US 7,652,458 B2
(45) Date of Patent: Jan. 26, 2010

(54) POWER CONVERTING APPARATUS, ELECTRONIC APPARATUS COMPRISING THE SAME AND POWER CONVERTING METHOD

(75) Inventor: Jeong-gyu Park, Yongin-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 353 days.

(21) Appl. No.: 11/657,552

(22) Filed: Jan. 25, 2007

(65) Prior Publication Data
US 2007/0211506 A1    Sep. 13, 2007

(30) Foreign Application Priority Data
Mar. 8, 2006    (KR)    ............... 10-2006-0021957

(51) Int. Cl.
G05F 1/00    (2006.01)
(52) U.S. Cl. .................................... 323/282
(58) Field of Classification Search ............ 323/282, 323/284, 285, 286
See application file for complete search history.

(56) References Cited

U.S. PATENT DOCUMENTS

| | | | |
|---|---|---|---|
| 5,708,356 A | 1/1998 | Onodera | |
| 6,054,874 A | 4/2000 | Sculley et al. | |
| 6,337,563 B2* | 1/2002 | Takimoto et al. | 323/284 |
| 6,420,858 B1* | 7/2002 | Kitagawa et al. | 323/282 |
| 7,109,785 B2 | 9/2006 | Derksen | |
| 2005/0030091 A1 | 2/2005 | Derksen | |

FOREIGN PATENT DOCUMENTS

| | | |
|---|---|---|
| JP | 2004-248343 | 9/2004 |
| JP | 2005-18783 | 1/2005 |
| KR | 2002-71215 | 9/2002 |

OTHER PUBLICATIONS

Chinese Office Action issued Nov. 7, 2008.

* cited by examiner

*Primary Examiner*—Adolf Berhane
*Assistant Examiner*—Yemane Mehari
(74) *Attorney, Agent, or Firm*—Jefferson IP Law, LLP

(57) ABSTRACT

A power converting apparatus includes a power input part to which power is input; a power converting part converting the power input through the power input part; a converting current detecting part detecting a converting current of the power converted in the power converting part; a converting voltage detecting part detecting a converting voltage of the power converted in the power converting part; and a controlling part controlling the power converting part so that a value of power calculated by multiplication of the converting current detected in the converting current detecting part by the converting voltage detected in the converting voltage detecting part falls within a predetermined range of a preset reference value.

25 Claims, 8 Drawing Sheets

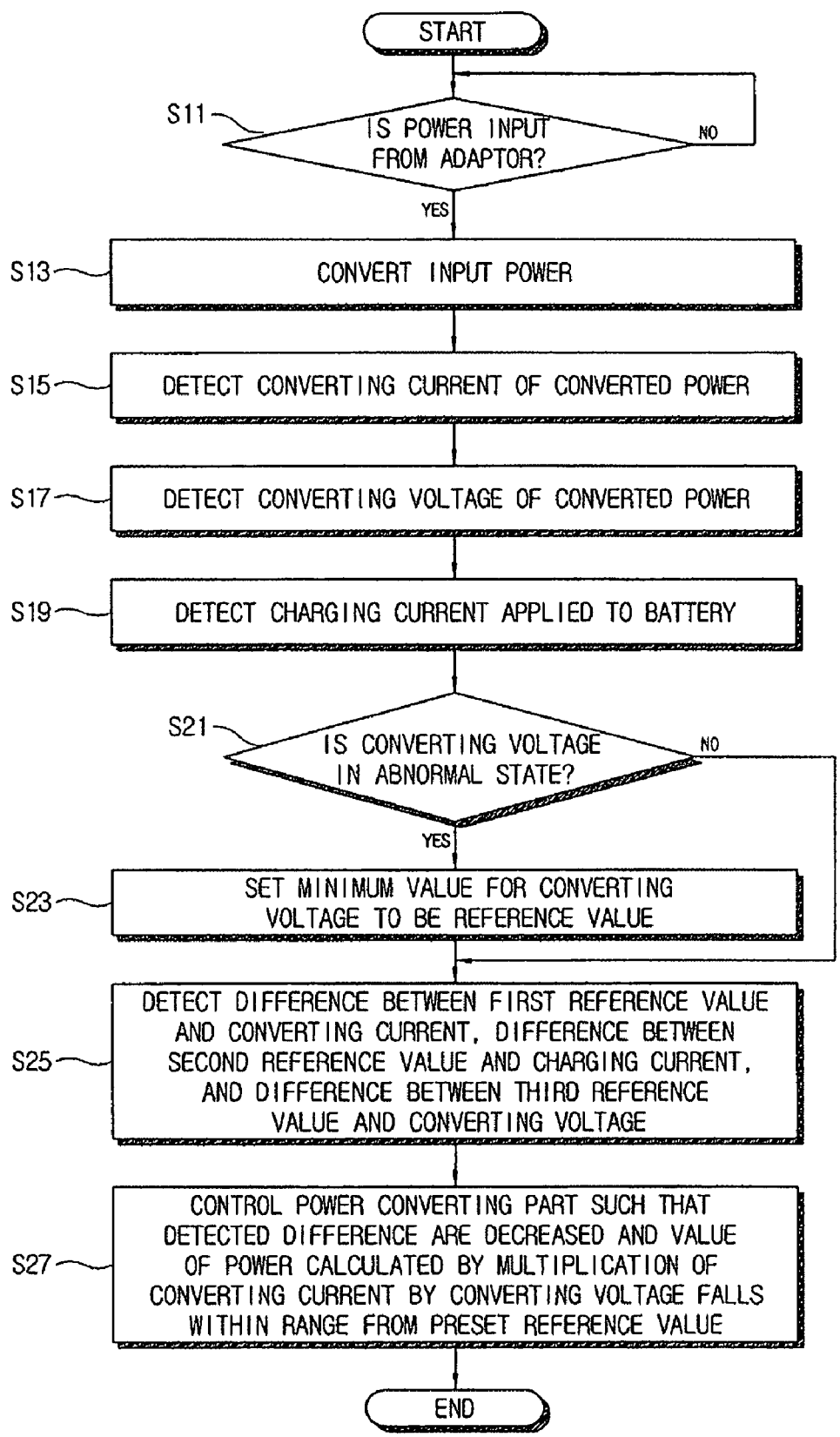

POWER CONVERTING APPARATUS, ELECTRONIC APPARATUS COMPRISING THE SAME AND POWER CONVERTING METHOD

CROSS-REFERENCE TO RELATED APPLICATION

This application claims the benefit of Korean Patent Application No. 2006-21957, filed on Mar. 8, 2006, in the Korean Intellectual Property Office, the disclosure of which is incorporated herein by reference.

BACKGROUND OF THE INVENTION

1. Field of the Invention

An aspect of the present invention relates to a power converting apparatus, an electronic apparatus including the same and a power converting method, and more particularly, to a power converting apparatus with an improved current detector detecting current to form the basis of power input to a system, an electronic apparatus including the same and a power converting method.

2. Description of the Related Art

In general, a power converting apparatus, such as a system charger, receives power from a power source, such as an adaptor, and converts the received power into power by which a system can be driven.

As shown in FIG. 7, a conventional electronic apparatus includes an adaptor 710, a power converter 750, a first current detector 730, provided at an input terminal of the power converter 750, detecting current output from the adaptor 710, a second current detector 740, a battery 760, a controller 790, and a system 770. As shown in FIG. 7, the first current detector 730 in the conventional electronic apparatus is located at the input terminal of the power converter 750 and detects the intensity of current output from the adaptor 710.

In such a conventional electronic apparatus, the controller 790 operates according to the current detected by the first current detector 730 provided at the input terminal of the current converter 750. That is, the controller 790 cannot accurately control the current converter 750. Accordingly, when the level of current or voltage of the system 770 suddenly changes due to a variation in the load of the system 770, an inductor L of the power converter is saturated. Accordingly, in the conventional electronic apparatus, current flowing into the inductor L increases suddenly, thereby causing a short-circuit of a switch Qsw, that is, a malfunction of the apparatus.

SUMMARY OF THE INVENTION

Accordingly, it is an aspect of the present invention to provide a power converting apparatus, which is capable of allowing a power converter to convert power more stably by improving a current detector detecting current forming the basis of the power input to a system, an electronic apparatus including the same and a power converting method.

The foregoing and/or other aspects of the present invention can be achieved by providing a power converting apparatus including: a power input part to which power is input; a power converting part converting the power input through the power input part; a converting current detecting part detecting a converting current of the power converted in the power converting part; a converting voltage detecting part detecting a converting voltage of the power converted in the power converting part; and a controlling part controlling the power converting part so that a value of power calculated by multiplication of the converting current detected in the converting current detecting part by the converting voltage detected in the converting voltage detecting part falls within a predetermined range of a preset reference value.

According to the embodiment of the present invention, the power converting part further includes a switch switching the input power, wherein the controlling part controls the switch so that the calculated value of power falls within the predetermined range of the preset reference value.

According to the embodiment of the present invention, the power converting part includes the switch having a first end connected to an input terminal of the power converting part, an inductor having a first end connected to a second end of the switch and a second end connected to an output terminal of the power converting part, a first capacitor having a first end connected to the first end of the switch, a diode having a first end connected to the second end of the switch and a second end connected to a second end of the first capacitor, and a second capacitor having a first end connected to the second end of the inductor and a second end connected to the second end of the first capacitor.

According to another embodiment of the present invention, the controlling part sets a minimum value for the converting voltage, and, upon determining that the converting voltage is in an abnormal state, calculates the value of power based on the minimum value.

According to another embodiment of the present invention, the power converting apparatus further includes a battery connected in parallel to the power converting part, wherein the converting voltage detecting part is provided at an input terminal of the battery detecting voltages at the input terminal and a ground terminal of the battery.

According to another embodiment of the present invention, the power converting apparatus further includes a charging current detecting part detecting a charging current applied to the battery, wherein the controlling part controls the switch based on the detected converting current, converting voltage and charging current.

According to another embodiment of the present invention, the controlling part stores reference values corresponding to the converting current, the converting voltage and the charging current, respectively, detects differences between the converting current, the converting voltage and the charging current and the respective reference values, and controls the switch so that the detected differences become decreased.

According to another embodiment of the present invention, the controlling part compares the converting current with a predetermined reference value reversely proportional to the converting voltage.

The foregoing and/or other aspects of the present invention can be achieved by providing an electronic apparatus including: a system; a power input part to which power is input; a power converting part converting the input power and outputting the converted power to the system; a converting current detecting part detecting a converting current of the power converted in the power converting part; a converting voltage detecting part detecting a converting voltage of the power converted in the power converting part; and a controlling part controlling the power converting part so that a value of power calculated by multiplication of the converting current detected in the converting current detecting part by the converting voltage detected in the converting voltage detecting part falls within a predetermined range from a preset reference value.

According to another embodiment of the present invention, the power converting part further includes a switch switching the input power, wherein the controlling part controls the switch so that the calculated value of power falls within the predetermined range of the preset reference value.

According to another embodiment of the present invention, the controlling part sets a minimum value for the converting voltage, and, upon determining that the converting voltage is in an abnormal state, calculates the value of power based on the minimum value.

According to another embodiment of the present invention, the electronic apparatus further includes a battery connected in parallel to the power converting part, wherein the converting voltage detecting part is included in the battery detecting voltages at one terminal and a ground terminal of the battery.

According to another embodiment of the present invention, the electronic apparatus further includes a charging current detecting part detecting a charging current applied to the battery, wherein the controlling part controls the switch based on the detected converting current, converting voltage and charging current.

According to another embodiment of the present invention, the electronic apparatus further includes a power supply supplying power to the power input part.

The foregoing and/or other aspects of the present invention can be achieved by providing a power converting method including: inputting power; converting the input power; detecting a converting current of the converted power; detecting a converting voltage of the converted power; and converting the input power so that a value of power calculated by multiplication of the detected converting current by the detected converting voltage falls within a predetermined range of a preset reference value.

According to another embodiment of the present invention, the power converting method further includes setting a minimum value of the converting voltage, wherein, if determined that the converting voltage is in an abnormal state, the converting of the input power includes calculating the value of power based on the minimum value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a flowchart of a power converting method according to an embodiment of the present invention.

DETAILED DESCRIPTION OF THE EMBODIMENTS

Figure 1:
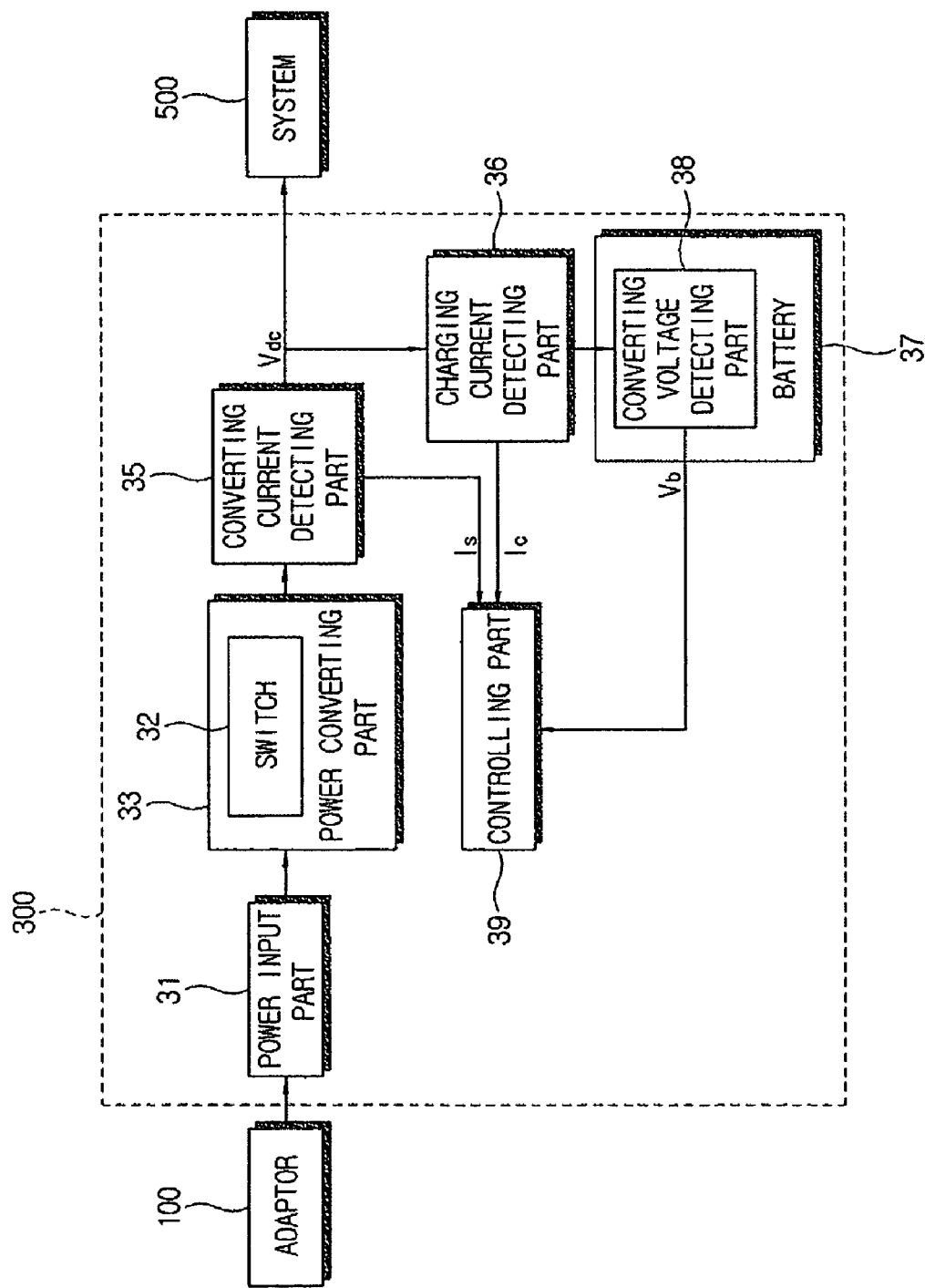
FIG. 1 is a control block diagram of an electronic apparatus including a power converting apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As shown in FIG. 1, an electronic apparatus according to an embodiment of the present invention may include a system 500 and a power converting apparatus 300. In addition, the electronic apparatus may further include a power supplying part, as necessary.

The power supplying part outputs driving power to drive the system 500. In this embodiment, the power supplying part may include a power source such as an adaptor 100 or the like. In the following description, the adaptor 100 is employed as the power supplying part.

The system 500 includes various parts for performing respective functions of the electronic apparatus. In this embodiment, the system 500 includes various parts within the electronic apparatus, except for the adaptor 100, the battery 37 and the power converting apparatus 300. For example, if the electronic apparatus of the present invention is a computer, the system 500 may include a CPU (Central Processing Unit), a RAM (Random Access Memory), a ROM (Read Only Memory), a main board, an HDD (Hard Disk Driver), etc., or if the electronic apparatus is a TV, the system 500 may include a screen, a tuner, a scaler, etc.

The power converting apparatus 300 may include a power input part 31, a power converting part 33, a converting current detecting part 35, a converting voltage detecting part 38, and a controlling part 39 controlling these components. In addition, the power converting apparatus 300 may further include a charging current detecting part 36 and the battery 37, as necessary.

The power input part 31 receives power from the adaptor 100. In this embodiment, the power input part 31 may include a variety of components such as a power port, a power line and the like for receiving the power.

The power converting part 33 converts the power input through the power input part 31 and output the converted power to the system 500. In this embodiment, the power converting part 33 may include a converter such as a DC/DC converter, and serves as a system charger. In this embodiment, the power converting part 33 includes a switch 32. The power is converted according to switching of the switch 32. In this embodiment, it is preferable but not necessary that the switch 32 is provided as a transistor such as a FET.

Details of the power converting part 33 will be described later. In this embodiment, the power converted in the power converting part 33 is applied to the system and used to drive the system 500. In addition, the power converted in the power converting part 33 may be output to the battery 37 and used to charge the battery 37.

The converting current detecting part 35 detects a converting current Is of the power converted in the power converting part 33. In this embodiment of the present invention, the converting current detecting part 35 may include a first detecting resistor detecting the level of the converting current Is. In this case, the converting current detecting part 35 may output a voltage across the first detecting resistor to the controlling part 39, which will be described later. In this embodiment of the present invention, the resistance of the first detecting resistor is fixed, and accordingly, the controlling part 39 can calculate a value of the converting current Is based on the voltage detected through the converting current detecting part 35 according to the formula of V=IR.

The charging current detecting part 36 detects a charging current Ic of charging power input to the battery 37 so as to charge the battery 37. In this embodiment of the present invention, the charging current detecting part 36 may include a second detecting resistor detecting the charging current Ic, like the converting current detecting part 35. In this case, the charging current detecting part 36 may also output a voltage across the second detecting resistor to the controlling part 39, which will be described later. In this embodiment of the present invention, the resistance of the second detecting resistor is fixed, and accordingly, the controlling part 39 can calculate a value of the charging current Ic based on the voltage detected through the charging current detecting part 36 according to the formula of V=IR.

The battery 37 is charged when the power output from the power converting part 33 is applied to the battery 37. If power is not supplied from the adaptor 100 or the like to the system 500, the battery 37 supplies power to the system 500.

In this embodiment of the present invention, the battery 37 may include the converting voltage detecting part 38. In this case, the converting voltage detecting part 38 detects the converting voltage of the power output from the power converting part 33 and outputs the detected converting voltage to the controlling part 39, which will be described later. Although the converting voltage detecting part 38 is contained in the battery 37 in this embodiment, the converting voltage detecting part 38 may be provided at an output terminal of the power converting part 33 if the converting voltage detecting part 38 can detect the converting voltage by itself. Furthermore, since the converting voltage is a voltage of the power output from the power converting part 33, it corresponds to a voltage Vdc shown in FIG. 1. Accordingly, the converting voltage detecting part 38 may be provided at a position at which the voltage Vdc is shown in FIG. 1.

In this embodiment of the present invention, it is preferable but not necessary that the resistance of the second detecting resistor included in the charging current detecting part 36 is set to be very low. Accordingly, it is preferable but not necessary that a voltage across the charging current detecting part 36 is negligibly low. Then, a voltage across an input terminal of the battery 37 is highly approximate to the voltage Vdc. Accordingly, when the battery 37 contains the converting voltage detecting part 38, it is preferable but not necessary that the converting voltage detecting part 38 is provided at the input terminal of the battery 37. Thus, the converting voltage detecting part 38 can detect a voltage across the input terminal and a ground terminal of the battery 37 as the converting voltage. In the following description, the converting voltage is referred to as a voltage Vb detected in the converting voltage detecting part 38.

In this embodiment of the present invention, the controlling part 39 receives the converting current Is detected in the converting current detecting part 35, the charging current Ic detected in the charging current detecting part 36, and the converting voltage Vb detected in the converting voltage detecting part 38. Then, the controlling part 39 controls the power converting part 33 based on at least one of the input converting current Is, the charging current Ic and the converting voltage Vb.

The controlling part 39 can control the power converting part 33 so that a value of power calculated by the multiplication of the converting current Is, detected in the converting current detecting part 35, by the converting voltage Vb, detected in the converting voltage detecting part 38, falls within a predetermined range of a preset reference value. Here, a mode that the controlling part 39 controls the value of power to be constant may be referred to as a CP (Constant Power) mode. For example, for a reference value of 72W, the controlling part 39 can control the power converting part 33 so that the converting current is 6A when the converting voltage is 12V or the converting current is 8A when the converting voltage is 9V.

Figure 2:
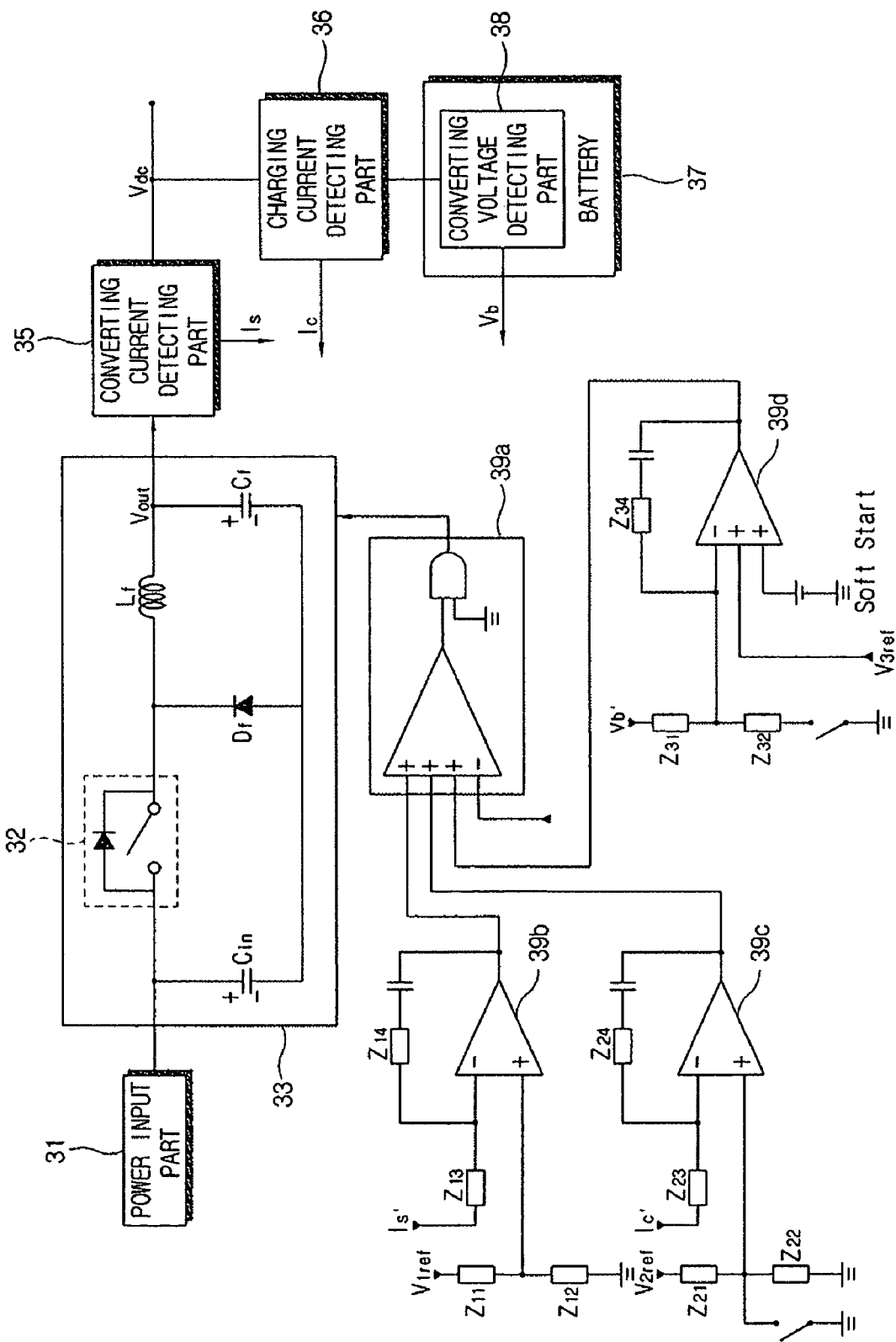
FIG. 2 is a detailed control block diagram of the power converting apparatus according to an embodiment of the present invention.

FIG. 2 is a detailed control block diagram of the power converting apparatus 300 according to an embodiment of the present embodiment.

As shown in FIG. 2, the power converting part 33 of the power converting apparatus 300 may include elements such as inductors, capacitors and so on in addition to the switch 32.

More specifically, the switch 32 may be connected to the input terminal of the power converting part 33. In this case, one end of the switch 32 may be connected to the input terminal of the power converting part 33 and the other end of the switch 32 may be connected to an inductor Lf. One end of the inductor Lf may be connected to the other end of the switch 32 and the other end of the inductor Lf may be connected to the output terminal of the power converting part 33. In addition, a first capacitor Cin may have one end connected to the input terminal of the power converting part 33, that is, the one end of the switch 32, and the other end connected to a ground terminal. In addition, a diode Df may have one end connected to the other end of the switch 32, that is, the one end of the inductor Lf, and the other end connected to the other end of the first capacitor Cin. In addition, a second capacitor Cf may have one end connected to the output terminal of the power converting part 33, that is, the other end of the inductor Lf, and the other end connected to the other end of the first capacitor Cin.

In this embodiment of the present invention, the power converting part 33 has been described only by way of example, but it is sufficient if it may convert the power input through the power input part 31. Therefore, the circuit configuration is not limited to the above-described example. That is, since the power converting part 33 includes the above-mentioned converter, system charger and so on, it is sufficient if it is only configured to play a role of the converter, the system charger and so forth.

In this embodiment of the present invention, the controlling part 39 may include a switching controller 39a and detecting signal determining parts 39b, 39c and 39d.

The detecting signal determining parts 39b, 39c and 39d may compare detecting signals detected through the converting current detecting part 35, the charging current detecting part 36 and the converting voltage detecting part 38 with respective predetermined reference values V1ref, V2ref and V3ref.

The detecting signal determining parts 39b, 39c and 39d may include a first detecting signal determining part 39b for determining the converting current Is, a second detecting signal determining part 39c for determining the charging current Ic, and a third detecting signal determining part 39d for determining the converting voltage Vb, respectively. In this case, it is preferable but not necessary that the respective reference values V1ref, V2ref and V3ref input to respective one ends of the first detecting signal determining part 39b, the second detecting signal determining part 39c, and the third detecting signal determining part 39d are different from one another. In addition, the respective reference values V1ref, V2ref and V3ref may be fixed, but preferably may be varied.

The first reference value V1ref is input to a first input terminal of the first detecting signal determining part 39b and a converting current Is' is input to a second input terminal of the first detecting signal determining part 39b. In FIG. 2, although the converting current Is output from the converting current detecting part 35 may be directly applied to the second input terminal of the first detecting signal determining part 39b without a separate process, the converting current Is' into which the converting current Is is converted through impedance (not shown), an amplifier (not shown) and so on may be applied to the second input terminal of the first detecting signal determining part 39b. In this case, a charging current Ic' into which the charging current Ic output from the charging current detecting part 36 is converted and a converting voltage Vb' into which the converting voltage Vb output from the converting voltage detecting part 38 is converted may be applied to the second input terminals of the second and third detecting signal determining parts 39c and 39d, respectively.

The first reference value V1ref input to the one end of the first detecting signal determining part 39b may be determined depending on the converting voltage Vb. As described above, the value of power equal to the multiplication of the converting voltage Vb input to the system 500 by the converting current Is input to the system 500 has to be constant. Accordingly, the controlling part 39 controls the power converting part 33 so that the converting current Is becomes small as the converting voltage Vb becomes large. To this end, the first reference value V1ref input to the first detecting signal determining part 39b may be designed to be reversely proportional to the converting voltage Vb. As an alternative, a value proportional to the first reference value V1ref may be input to the first detecting signal determining part 39b and then an inversion of the value may be output therefrom.

Figure 4:
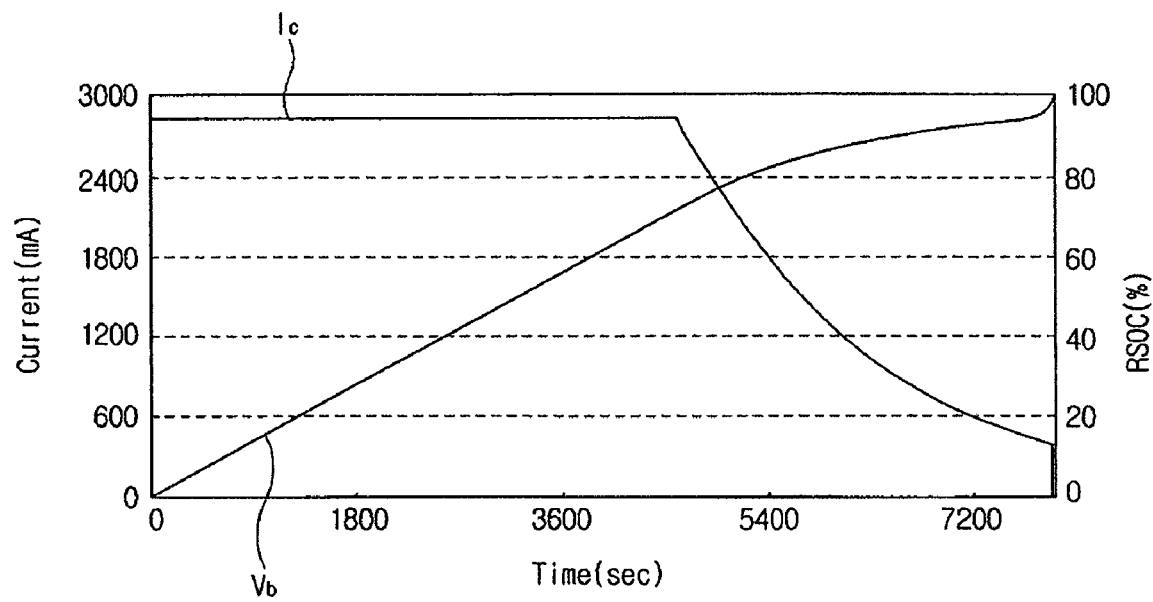
FIG. 4 is a graphical view showing a charging current and a converting voltage in an electronic apparatus according to an embodiment of the present invention.

The second reference value V2ref is input to the first input terminal of the second detecting signal determining part 39c and the charging current Ic is input to the second input terminal of the second detecting signal determining part 39c. In addition, the third reference value V3ref is input to the first input terminal of the third detecting signal determining part 39d and the converting voltage Vb is input to the second input terminal of the third detecting signal determining part 39d. Here, the second reference value V2ref and the third reference value V3ref may be determined depending on a charging characteristic of the battery 37. In this embodiment of the present invention, the charging characteristic may be shown as a graph of FIG. 4. It can be seen from the graph that the converting voltage Vb becomes large and the charging current Ic becomes small as the battery 37 is charged. Accordingly, in this embodiment of the present invention, the second reference value V2ref and the third reference-value V3ref may be set such that the charging current Ic and the converting voltage Vb are generated according to the charging characteristic.

In the mean time, the switching controller 39a may control the switch 32 of the power converting part 33 based on values applied from the first to third detecting signal determining parts 39b, 39c and 39d. In this embodiment of the present invention, the switching controller 39a may receive the first detecting signal output from the first detecting signal determining part 39b, the second detecting signal output from the second detecting signal determining part 39c, and the third detecting signal output from the third detecting signal determining part 39d. In addition, the switching controller 39a may control the switch 32 so that values of the detecting signals become small.

For example, upon receiving detecting signals according to a first difference between the first reference value V1ref and the converting current Is, a second difference between the second reference value V2ref and the charging current Ic, and a third difference between the third reference value V3ref and the converting voltage Vb, the switching controller 39a may control the switch 32 so that the respective differences become decreased. To this end, the switching controller 39a may control the switch 32, with a priority on a smaller one among the first difference, the second difference and the third difference.

For example, assuming that the first to third differences are 10, 20 and 30, respectively, the switching controller 39a may control the switch 32, with a priority on the converting current Is, so that the first difference falls within a predetermined range, and thereafter, may control the switch 32, with a priority on the charging current Ic and the converting voltage Vb in order. Although the priority has been placed on the smaller one among the differences in this embodiment, the priority may be placed on a larger one among the differences or may be adjusted randomly by a designer of an embodiment of the present invention.

As shown in FIG. 2, the controlling part 39 includes various impedances Z11, Z12, Z13, Z14, Z21, Z22, Z23, Z24, Z31, Z32 and Z34. These impedances may be changed as necessary.

A signal for soft start is input to only one end of the third detecting signal determining part 39d. However, this is only by way of example, and the signal for soft start may be input to the other detecting signal determining parts 39b and 39c, separately or together, as necessary.

In the mean time, the controlling part 39 may set a minimum value Vmin (see FIG. 3.) for the converting voltage Vb, and, upon determining that the converting voltage Vb is in an abnormal state, and the controlling part 39 may set the first reference value V1ref based on the minimum value Vmin. Here, the abnormality state may occur when the battery 37 is short-circuited or is removed from the electronic apparatus.

Figure 3:
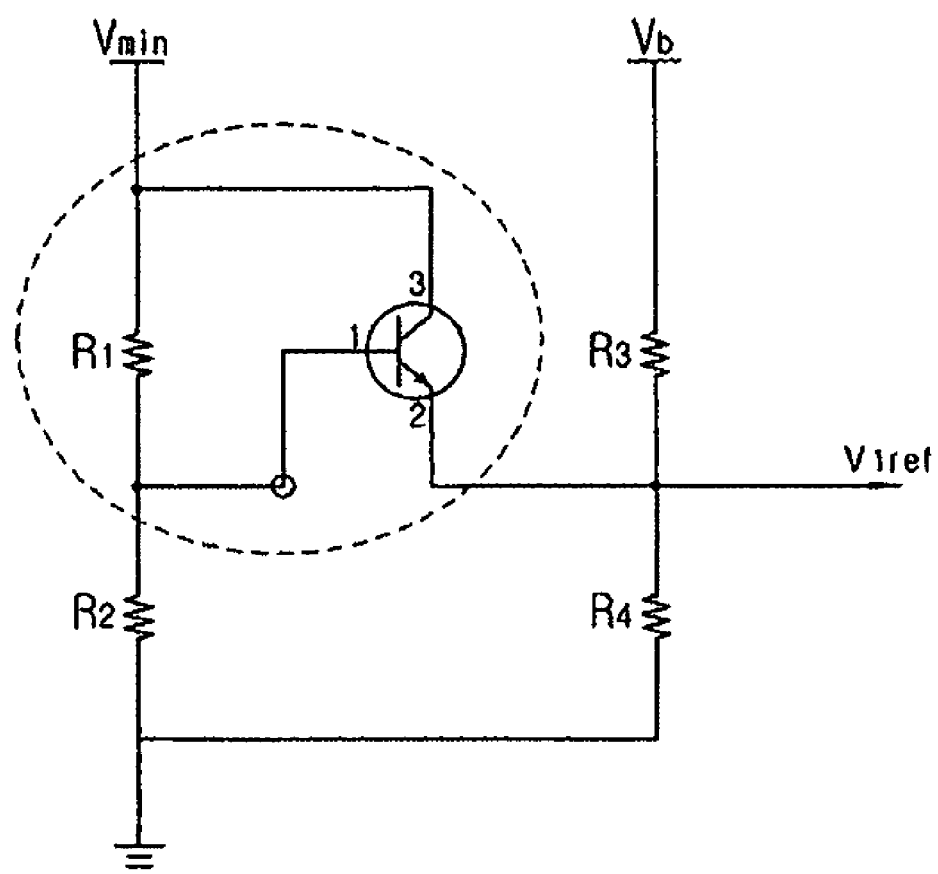
FIG. 3 is a circuit diagram in which a minimum value is set for a reference value in the power converting apparatus according to an embodiment of the present invention.

FIG. 3 shows a circuit diagram in which the minimum value Vmin is set for the first reference value V1ref according to the embodiment of the present invention. As described above, the first reference value V1ref depends on the converting voltage Vb. Accordingly, referring to FIG. 3, if the converting voltage Vb is larger than the minimum value Vmin, the converting voltage Vb is applied as the first reference value V1ref. On the contrary, if the converting voltage Vb is smaller than the minimum value Vmin, a transistor is turned on, and accordingly, the minimum value Vmin is applied as the first reference value V1ref.

That is, in this embodiment of the present invention, the controlling part 39 may set the minimum value Vmin for the converting voltage Vb, and, upon determining that the converting voltage Vb is in the abnormal state, calculate the first reference value V1ref based on the minimum value Vmin. Although the minimum value Vmin is applied as the first reference value V1ref if the converting voltage Vb is smaller than the minimum value Vmin, this is only by way of example, and it is sufficient if only the minimum value Vmin is output as the first reference value V1ref when it is determined that the converting voltage Vb is in the abnormal state.

Resistors R1, R2, R3 and R4 are shown in FIG. 3. The resistance, the arrangement and the circuit configuration of these resistors may be randomly set by the designer of an embodiment of the present invention.

In this embodiment of the present invention, the current flowing into the inductor Lf of the power converting part 33 is applied to the system 500 and the battery 37.

Figure 7:
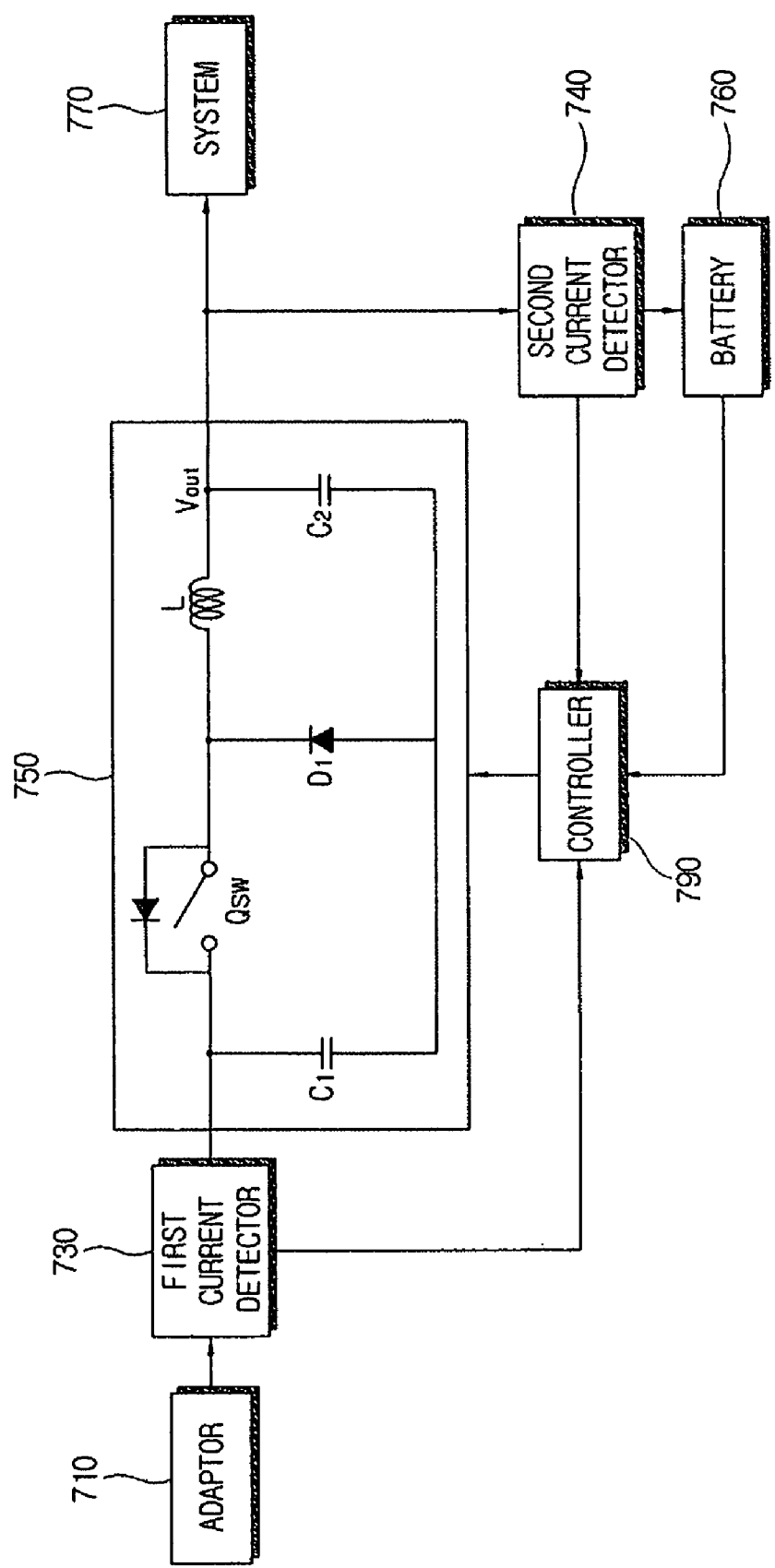
FIG. 7 is a control block diagram of a conventional electronic apparatus.

On the other hand, in a conventional power converting apparatus, current flowing into the system 770 may be instantaneously changed due to an instant load of the system 770. At this time, the first current detecting part 730 shown in FIG. 7 detects the current applied to the system 770 and adjusts the current by controlling the power converting part 750. That is, since the first current detecting part 730, provided at the input terminal of the power converting part 750 and is not controlled by the power converting part 750, detects the current, there is a delay when the current flowing into the power converting part 750 is controlled. In addition, capacitors included in the power converting part 750 increase the delay. Accordingly, in the conventional electronic apparatus, there is a possibility that current even larger than a saturation rated current flows into the inductor L of the power converting part 750. This may cause disorder or malfunction of the switch in the power converting part 750.

However, in the electronic apparatus of an embodiment of the present invention, since the converting current Is is detected at the output terminal of the power converting part 33, even if the current flowing into the system 500 is changed due to variation of a load of the system 500, such a change of the current can be detected to control switching of the switch 32. Accordingly, a ripple current flowing into the inductor Lf is fed back one by one (On Time Feedback) to the controlling part 39, thereby greatly reducing a current delay.

Figure 5A:
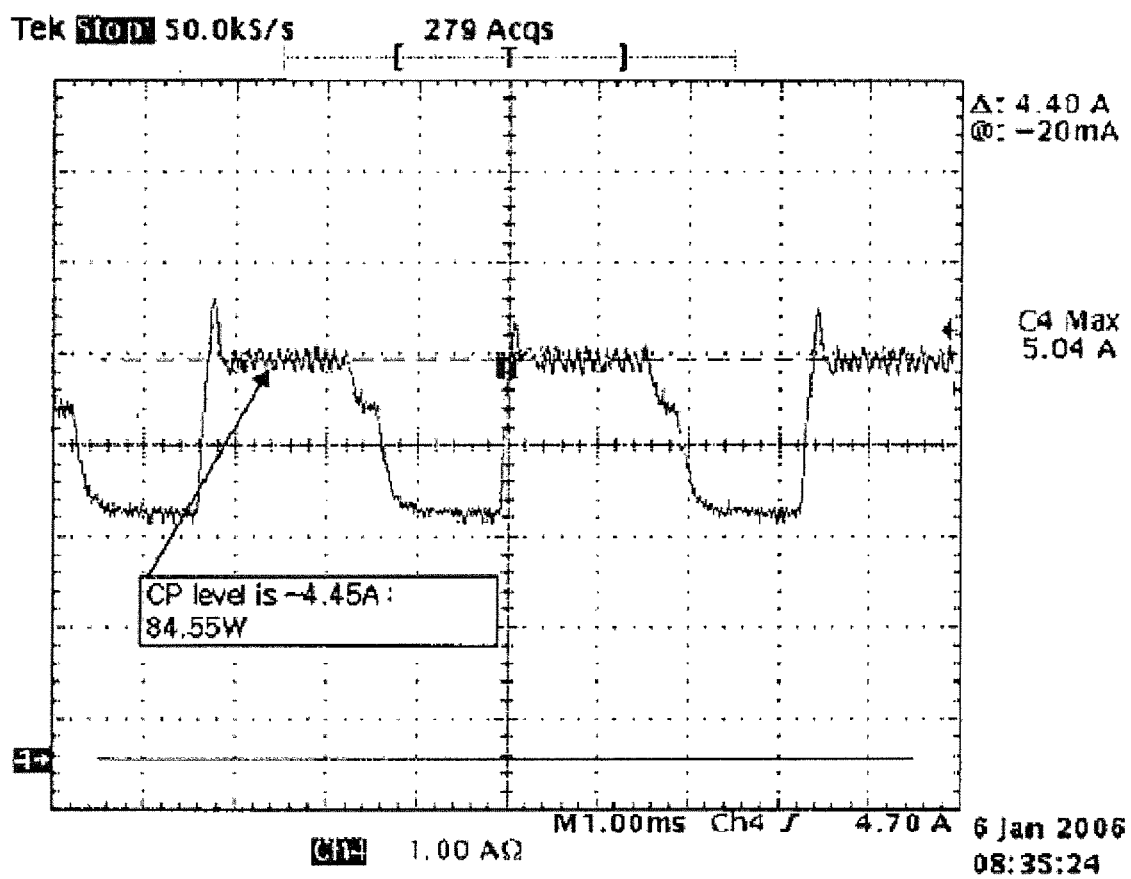
FIG. 5A is a graph showing an operation response of a power converter in the electronic apparatus according to the embodiment of the present invention.
Figure 5B:
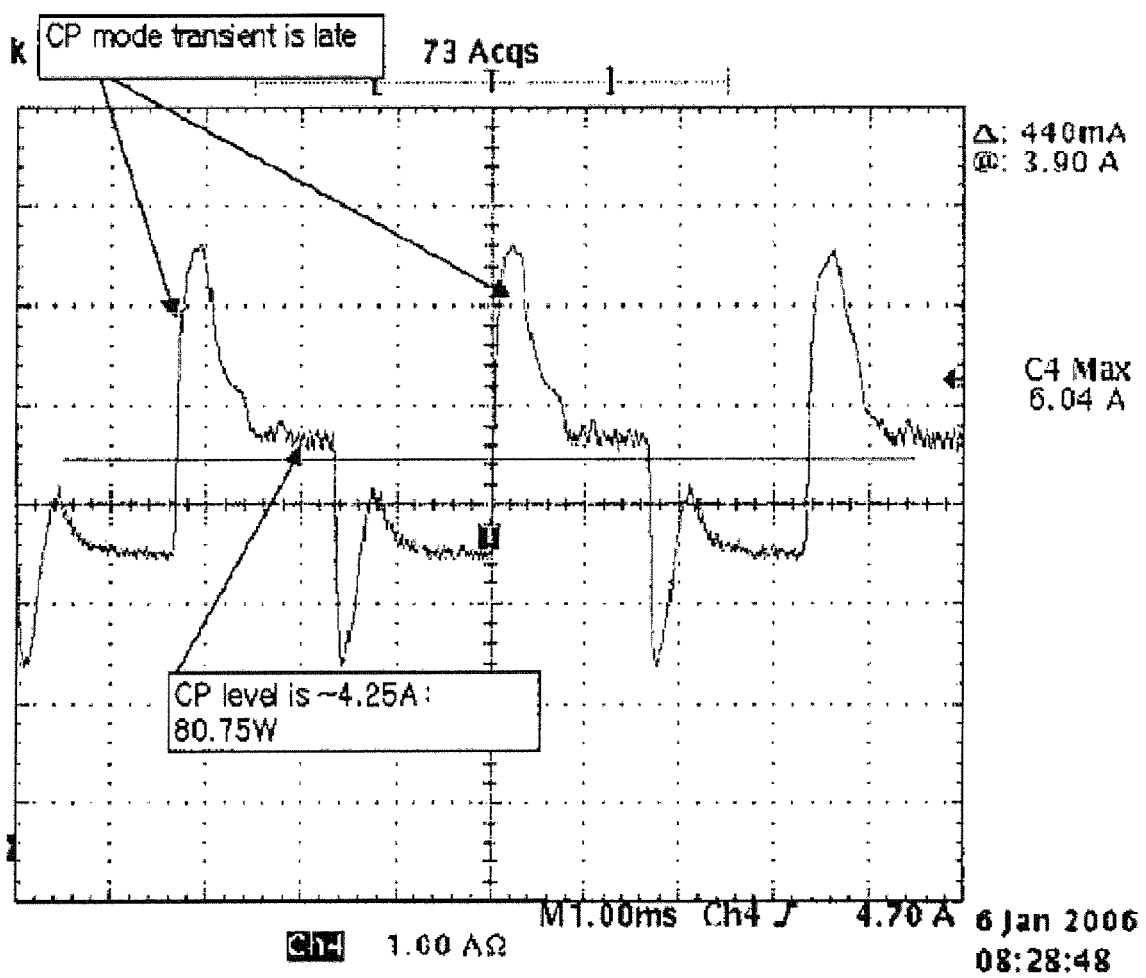
FIG. 5B is a graph showing an operation response of a power converter in a conventional electronic apparatus.

FIGS. 5A and 5B show experimental values in a CP mode for adjusting a value of power to be constant. As can be seen from FIG. 5B, the conventional power converting part 33 has a very slow response speed when current is changed. On the other hand, as can be seen from FIG. 5A, the power converting part 33 of an embodiment of the present invention has a very fast response speed over the response speed shown in FIG. 5B.

FIG. 6 is a flow chart of a power converting method according to an embodiment of the present invention.

Referring to FIG. 6, the power converting apparatus 300 receives power from the adaptor 100 at operation S11. The power converting part 33 of the power converting apparatus 300 converts the received power and outputs the converted power to the system 500 at operation S13. Next, the converting current detecting part 35 detects the converting current Is output from the power converting part 33 at operation S15, the converting voltage detecting part 38 detects the converting voltage Vb output from the power converting part 33 at operation S17, and the charging current detecting part 36 detects the charging current Ic output from the power converting part 33 and applied to the battery 37 at operation S19. In this case, as described above, the converting voltage detecting part 38 may be provided at the input terminal of the battery 37.

The detected converting current Is, the charging current Ic and the converting voltage Vb are applied to the controlling part 39. Specifically, the converting current Is detected in the converting current detecting part 35 is input to the first detecting signal determining part 39b, the charging current Ic detected in the charging current detecting part 36 is input to the second detecting signal determining part 39c, and the converting voltage Vb detected in the converting voltage detecting part 38 is input to the third detecting signal determining part 39d. Then, the first to third detecting signal determining parts 39b to 39d compare the detected current and voltage with the respective predetermined reference values V1ref, V2ref and V3ref. Operation and configuration of the first to third detecting signal determining parts 39b to 39d have been described above, and therefore, detail explanation thereof will be omitted for the sake of brevity.

Next, the controlling part 39 sets the minimum value Vmin for the converting voltage Vb, and, upon determining that the converting voltage Vb is an abnormal state at operation S21, sets the set minimum value Vmin for the converting voltage Vb to be the third reference value V3ref at operation S23. Determining that the converting voltage Vb is in the abnormal state has been described above, and therefore, detail explanation thereof will be omitted for the sake of brevity.

Next, the controlling part 39 detects the difference between the first reference value V1ref and the converting current Is, the difference between the second reference value V2ref and the charging current Ic, and the difference between the third reference value V3ref and the converting voltage Vb at operation S25. Next, the controlling part 39 controls the power converting part 33 such that the respective detected differences become decreased at operation S27. Specifically, when the converting current Is is adjusted, the controlling part 39 controls the power converting part 33 so that the value of power calculated by the multiplication of the converting current Is by the converting voltage Vb falls within a range from a preset reference value. In addition, when the converting voltage Vb and the charging current Ic are adjusted, the controlling part 39 controls the power converting part 33 so that the converting voltage Vb and the charging current Ic are changed to meet the charging characteristic of the battery 37.

As is apparent from the above description, an embodiment of the present invention provides a power converting apparatus, which is capable of allowing a power converter to convert power more stably by improving a position of a current detector for detecting current to form the basis of converting power input to a system, an electronic apparatus including the same and a power converting method.

Accordingly, in the power converting apparatus, the electronic apparatus comprising the same, and the power converting method according to an embodiment of the present invention, a response speed of a power source, according to control of the controlling part in the power converting part, is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power converting apparatus comprising:
    a power input part to which power is input;
    a power converting part converting the power input through the power input part;
    a converting current detecting part detecting a converting current of the power converted in the power converting part;
    a converting voltage detecting part detecting a converting voltage of the power converted in the power converting part; and
    a controlling part controlling the power converting part so that a value of power calculated by multiplication of the converting current detected in the converting current detecting part by the converting voltage detected in the converting voltage detecting part falls within a predetermined range of a preset reference value.

2. The power converting apparatus according to claim 1, wherein the power converting part further comprises a switch switching the input power, and
    the controlling part controls the switch so that the calculated value of power falls within the predetermined range of the preset reference value.

3. The power converting apparatus according to claim 2, wherein the power converting part comprises the switch having a first end connected to an input terminal of the power converting part, an inductor having a first end connected to a second end of the switch and a second end connected to an output terminal of the power converting part, a first capacitor having a first end connected to the first end of the switch, a diode having a first end connected to the second end of the switch and a second end connected to a second end of the first capacitor, and a second capacitor having a first end connected to the second end of the inductor and a second end connected to the second end of the first capacitor.

4. The power converting apparatus according to claim 2, wherein the controlling part sets a minimum value for the converting voltage, and, upon determining that the converting voltage is in an abnormal state, calculates the value of power based on the minimum value.

5. The power converting apparatus according to claim 1, further comprising a battery connected in parallel to the power converting part,
wherein the converting voltage detecting part is provided at an input terminal of the battery detecting voltages at the input terminal and a ground terminal of the battery.

6. The power converting apparatus according to claim 5, further comprising a charging current detecting part detecting a charging current applied to the battery, wherein the controlling part controls a switch of the power converting part based on the converting current, converting voltage and charging current.

7. The power converting apparatus according to claim 6, wherein the controlling part stores reference values corresponding to the converting current, the converting voltage and the charging current, respectively, detects differences between the converting current, the converting voltage and the charging current and the respective reference values, and controls the switch to decrease the detected differences.

8. The power converting apparatus according to claim 5, wherein the controlling part compares the converting current with a predetermined reference value reversely proportional to the converting voltage.

9. An electronic apparatus comprising:
a system;
a power input part to which power is input;
a power converting part converting the input power and outputting the converted power to the system;
a converting current detecting part detecting a converting current of the power converted in the power converting part;
a converting voltage detecting part detecting a converting voltage of the power converted in the power converting part; and
a controlling part controlling the power converting part so that a value of power calculated by multiplication of the converting current detected in the converting current detecting part by the converting voltage detected in the converting voltage detecting part falls within a predetermined range of a preset reference value.

10. The electronic apparatus according to claim 9, wherein the power converting part further comprises a switch switching the input power,
wherein the controlling part controls the switch so that the calculated value of power falls within the predetermined range of the preset reference value.

11. The electronic apparatus according to claim 10, wherein the controlling part sets a minimum value for the converting voltage, and, upon determining that the converting voltage is in an abnormal state, calculates the value of power based on the minimum value.

12. The electronic apparatus according to claim 9, further comprising a battery connected in parallel to the power converting part,
wherein the converting voltage detecting part is included in the battery and detects voltages at one terminal and a ground terminal of the battery.

13. The electronic apparatus according to claim 12, further comprising a charging current detecting part for detecting a charging current applied to the battery,
wherein the controlling part controls a switch of the power converting part based on the converting current, the converting voltage and the charging current.

14. The electronic apparatus according to claim 12, further comprising a power supply supplying power to the power input part.

15. A power converting method comprising:
inputting power;
detecting a converting current of the input power;
detecting a converting voltage of the input power; and
converting the input power so that a value of power calculated by multiplication of the converting current by the converting voltage falls within a predetermined range of a preset reference value.

16. The power converting method according to claim 15, further comprising setting a minimum value of the converting voltage,
wherein, if determined that the converting voltage is in an abnormal state, the converting of the input power comprises calculating the value of power based on the minimum value.

17. The power converting apparatus according to claim 1, wherein the power input part includes a power port and a power line.

18. The power converting apparatus according to claim 1, wherein the power converting part includes a DC/DC converter.

19. The power converting apparatus according to claim 1, wherein the controlling part further comprises a switching controller and detecting signal determining parts.

20. The power converting apparatus according to claim 2, wherein the switch is an FET.

21. The electronic apparatus according to claim 9, the power input part includes a power port and a power line.

22. The electronic apparatus according to claim 9, wherein the power converting part includes a DC/DC converter.

23. The electronic apparatus according to claim 9, wherein the switch is an FET.

24. A power converting apparatus comprising:
a power input unit to which power is input;
a current detecting unit detecting a current of the input power;
a voltage detecting unit detecting a voltage of the input power;
a power converter; and
a controlling unit controlling the current detecting unit, the voltage detecting unit and the power converter,
wherein the power converter converts the input power based on the detected current and voltage so that a power output by the power converter is within a predetermined range of a preset reference value and is calculated by multiplication of the detected current by the detected voltage.

25. The power converting apparatus according to claim 24, wherein the power converter further comprises a switch switching the input power, and the controlling unit controls the switch so that the calculated value of power is within the predetermined range of the preset reference value.

* * * * *

UNITED STATES PATENT AND TRADEMARK OFFICE
CERTIFICATE OF CORRECTION

| | | |
|---|---|---|
| PATENT NO. | : 7,652,458 B2 | Page 1 of 1 |
| APPLICATION NO. | : 11/657552 | |
| DATED | : January 26, 2010 | |
| INVENTOR(S) | : Jeong-gyu Park | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 354 days.

Signed and Sealed this

Twenty-eighth Day of December, 2010

David J. Kappos
*Director of the United States Patent and Trademark Office*